(12) United States Patent
Subramaniam et al.

(10) Patent No.: US 11,573,728 B2
(45) Date of Patent: Feb. 7, 2023

(54) SYSTEM AND METHOD FOR DYNAMICALLY CALCULATING AND EXECUTING DATA BACKUP POLICIES FOR A MULTI-TENANT CLUSTER STORAGE

(71) Applicant: BANK OF AMERICA CORPORATION, Charlotte, NC (US)

(72) Inventors: Praveen Athani Subramaniam, Tamilnadu (IN); Kritika Rai, Maharashtra (IN); Sheetal Bhatia, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 58 days.

(21) Appl. No.: 17/350,858

(22) Filed: Jun. 17, 2021

(65) Prior Publication Data

US 2022/0404971 A1 Dec. 22, 2022

(51) Int. Cl.
| | |
|---|---|
| *G06F 12/00* | (2006.01) |
| *G06F 3/06* | (2006.01) |
| *G06F 16/23* | (2019.01) |
| *G06F 16/245* | (2019.01) |

(52) U.S. Cl.
CPC .............. *G06F 3/065* (2013.01); *G06F 3/067* (2013.01); *G06F 3/0619* (2013.01); *G06F 16/2379* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 2019/0129807 A1* | 5/2019 | Zhang | G06F 9/45558 |
| 2021/0117283 A1* | 4/2021 | Wang | H04L 67/1001 |
| 2021/0303409 A1* | 9/2021 | Seshadri | G06F 11/1451 |

* cited by examiner

*Primary Examiner* — Daniel D Tsui
(74) *Attorney, Agent, or Firm* — Moore & Van Allen PLLC; Nicholas C. Russell

(57) ABSTRACT

Embodiments of the present invention provide a system for calculating and executing data backup policies for a multi-tenant cluster storage. The system is configured for accessing one or more audit logs associated with one or more applications, where the one or more applications comprise one or more folders, accessing a footfall database to identify footfall data associated with the one or more applications, determining criticality of the one or more folders associated with the one or more applications based on the footfall data, determining a dynamic backup policy schedule for the one or more applications, storing the dynamic backup policy schedule in a backup policy database, based on the dynamic backup policy schedule, determining that at least one application of the one or more applications needs backup at a current time, and executing a backup policy and take a backup of the at least one application.

20 Claims, 10 Drawing Sheets

SYSTEM AND METHOD FOR DYNAMICALLY CALCULATING AND EXECUTING DATA BACKUP POLICIES FOR A MULTI-TENANT CLUSTER STORAGE

BACKGROUND

Conventional systems do not have the capability to dynamically calculate and execute data backup policies. As such, there exists a need for a system that dynamically calculates and executes data backup policies for a multi-tenant cluster storage.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamically calculating and executing data backup policies for a multi-tenant cluster storage. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention accesses one or more audit logs associated with one or more applications, where the one or more applications comprise one or more folders, accesses a footfall database to identify footfall data associated with the one or more applications, determines criticality of the one or more folders associated with the one or more applications based on the footfall data, determines a dynamic backup policy schedule for the one or more applications, stores the dynamic backup policy schedule in a backup policy database, based on the dynamic backup policy schedule, determines that at least one application of the one or more applications needs backup at a current time, and executes a backup policy and take a backup of the at least one application.

In some embodiments, the system continuously monitors the one or more applications and determines a need for an ad hoc backup for at least one application and instantaneously executes the ad hoc backup based on the dynamic backup policy schedule associated with the at least one application.

In some embodiments, the system determines the need for the ad hoc backup for the at least one application based on performing at least one of determining a spike in a number of incoming files added to the one or more folders associated with the one or more applications, determining a spike in file size associated with the incoming files that is being added to the one or more folders of the one or more applications, determining that a combination of the number of the incoming files and the file size of the incoming files is above a threshold value; and determining frequency of initiation of recovery process by one or more users.

In some embodiments, the system determines the criticality of the one or more folders based on determining a number of recovery attempts in a predefined amount of time based on audit log data from the one or more audit logs, determining a time of a most recently recovered backup associated with the one or more applications based on the audit log data, determining average number of footfalls for the one or more applications based on the footfall data, determining anti-pattern file presence associated with the one or more applications, determining criticality update data associated with the one or more applications, wherein the criticality update data is received from one or more users associated with the one or more applications, and determining, via a machine learning model, weights associated with each of the number of recovery attempts, the time of the recently recovered backup, the average number of footfalls, the anti-pattern presence, and the criticality update data.

In some embodiments, the system aggregates the weight determined by the machine learning model, determines that the weight is above or below a predefine value, and determines the criticality of the one or more folders associated with the one or more applications based determining that the weight is above or below the predefined value.

In some embodiments, the system determines the dynamic backup policy schedule for the one or more applications based on: determining a number of footfalls associated with each of the one or more folders associated with the one or more applications for a predefined amount of time, determining that count of the number of footfalls for the predefined amount of time is greater than zero, aggregating daily footfalls for each day of a week based on the footfall data, determining dynamic backup policy schedule for the each day of the week based on start time and end time of the daily footfalls for the each day, and updating the backup policy database with the dynamic backup policy schedule.

In some embodiments, the system determines that the count of the number of footfalls for the predefined amount of time is not greater than zero and performs one of (i) determining if auto-correlation exists based on the footfall data or (ii) determining if seasonality exists based on the footfall data, and updates the backup policy database based on determining that (i) the auto-correlation exists or (ii) the seasonality exists.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
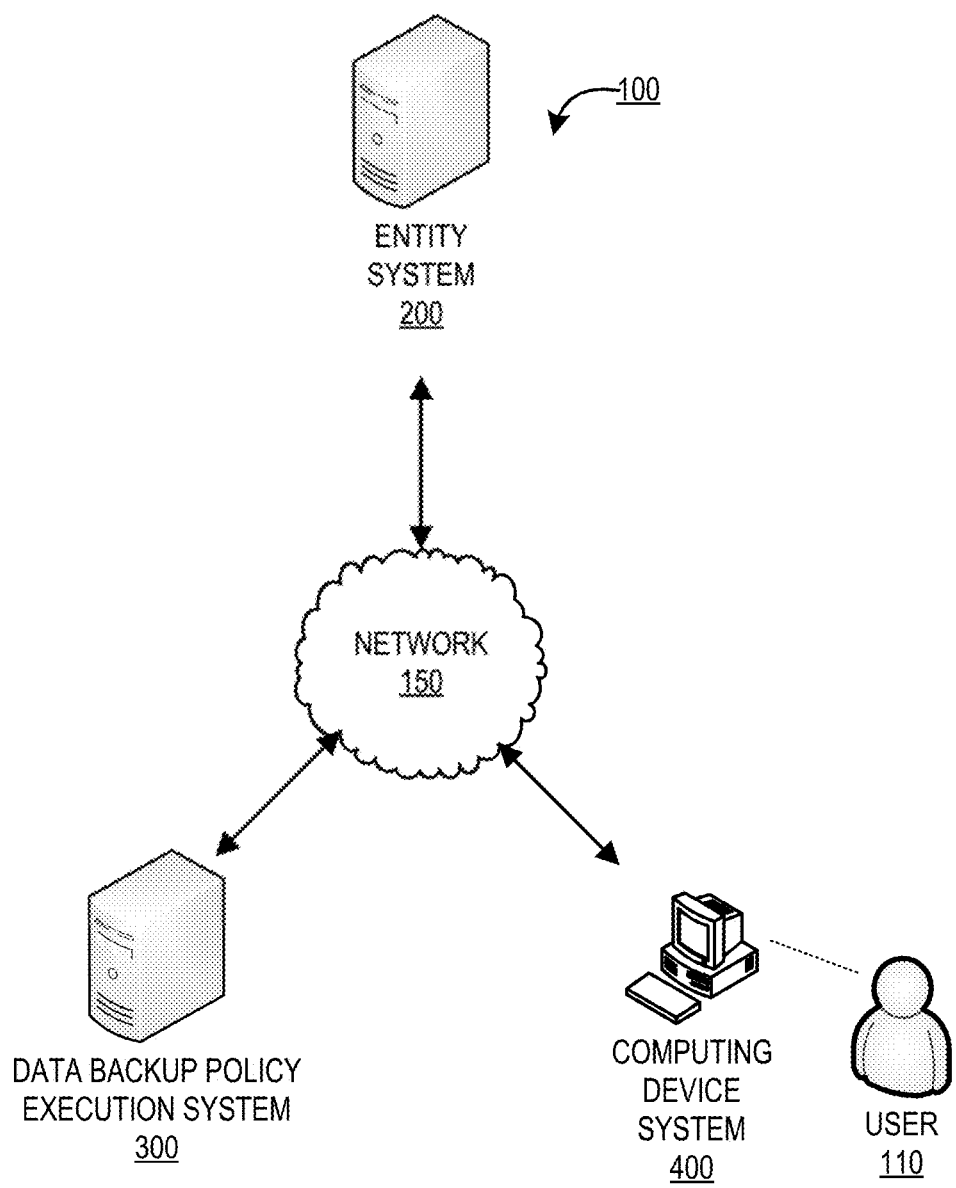
Figure 2:
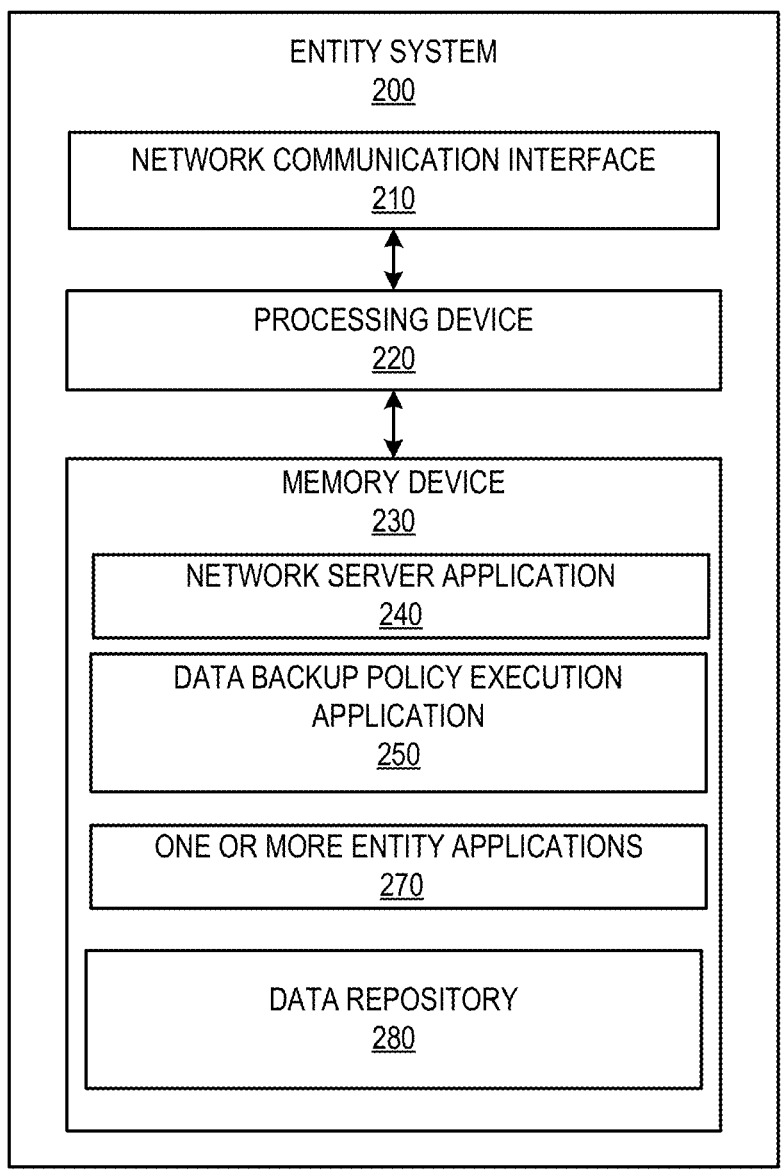
Figure 3:
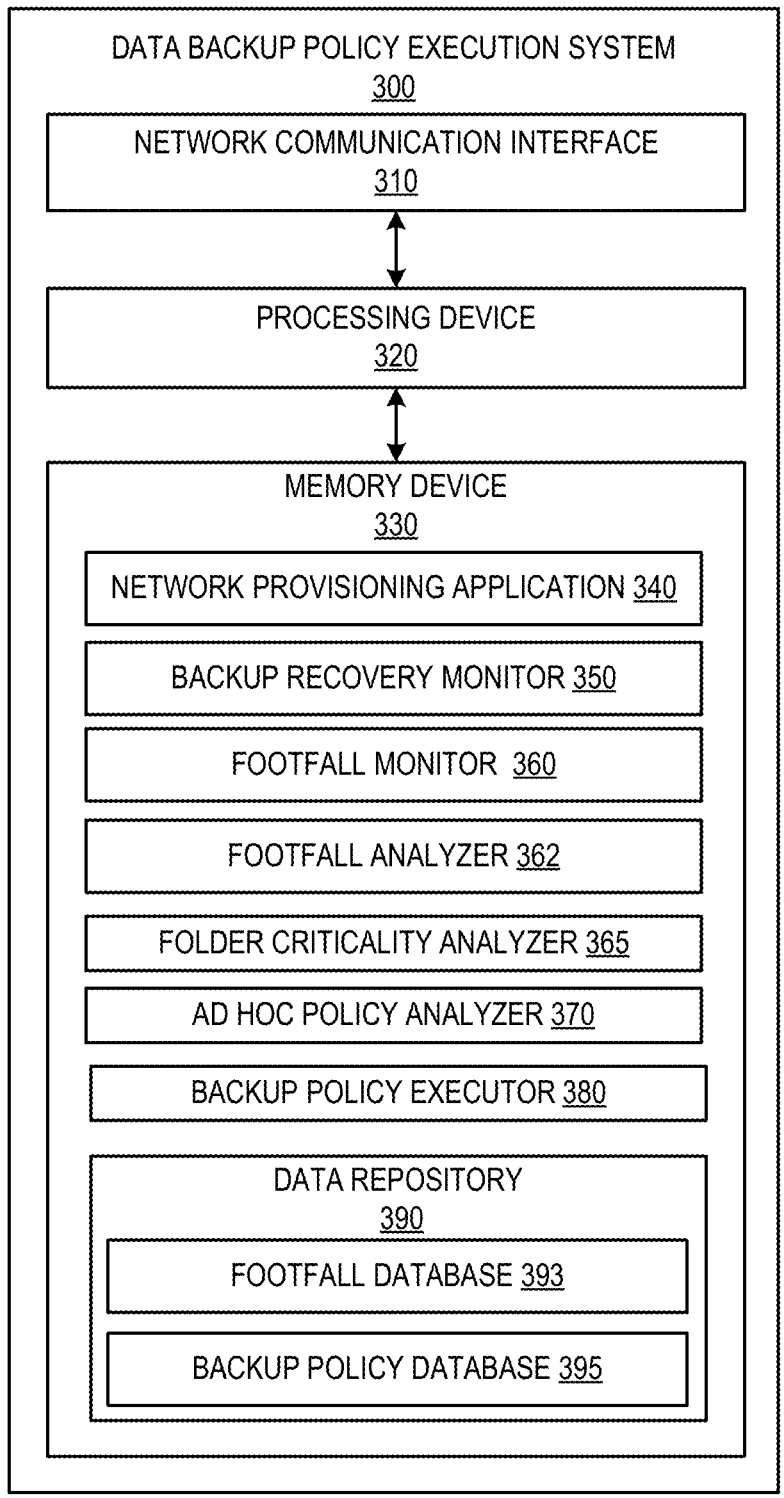
Figure 4:
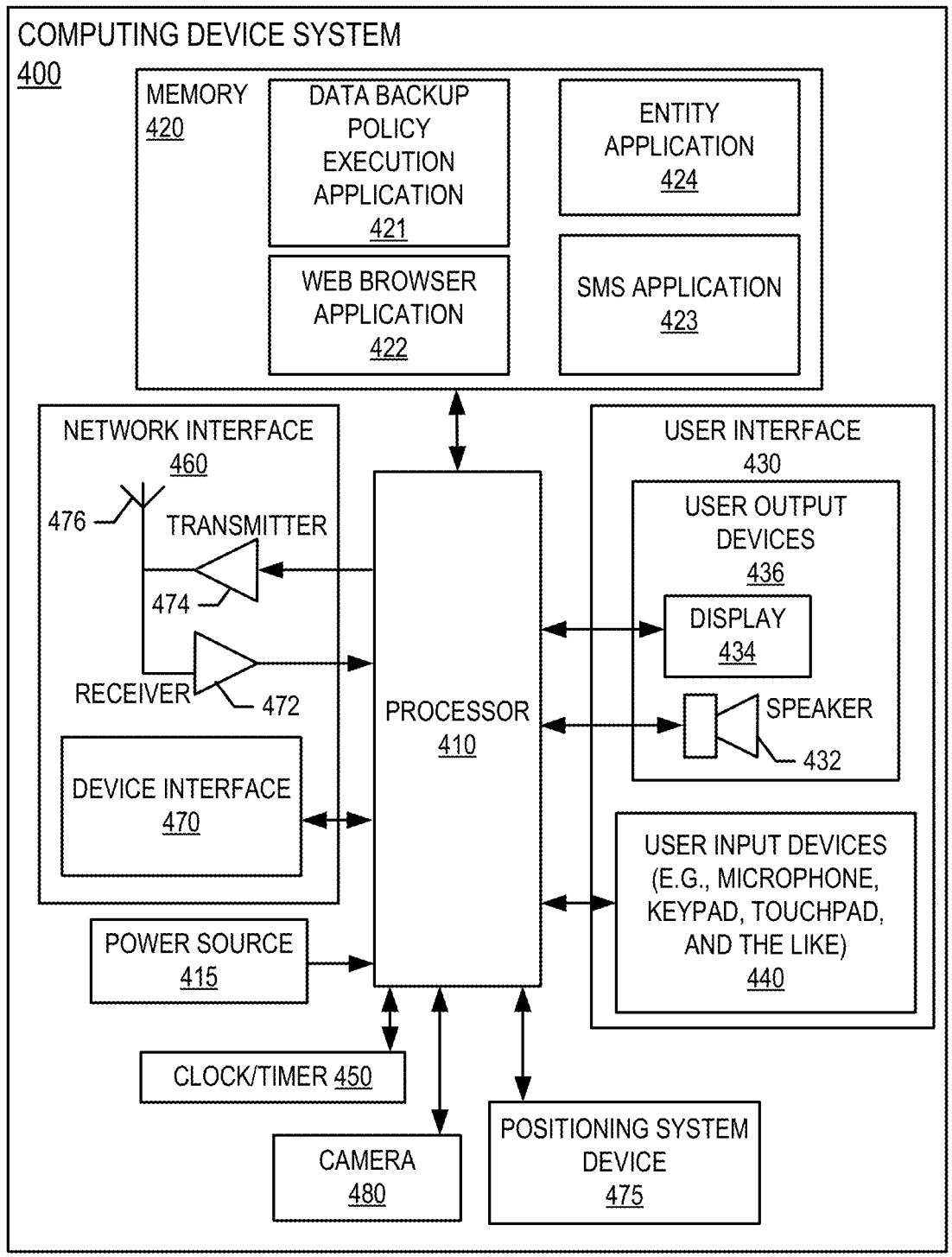
Figure 5:
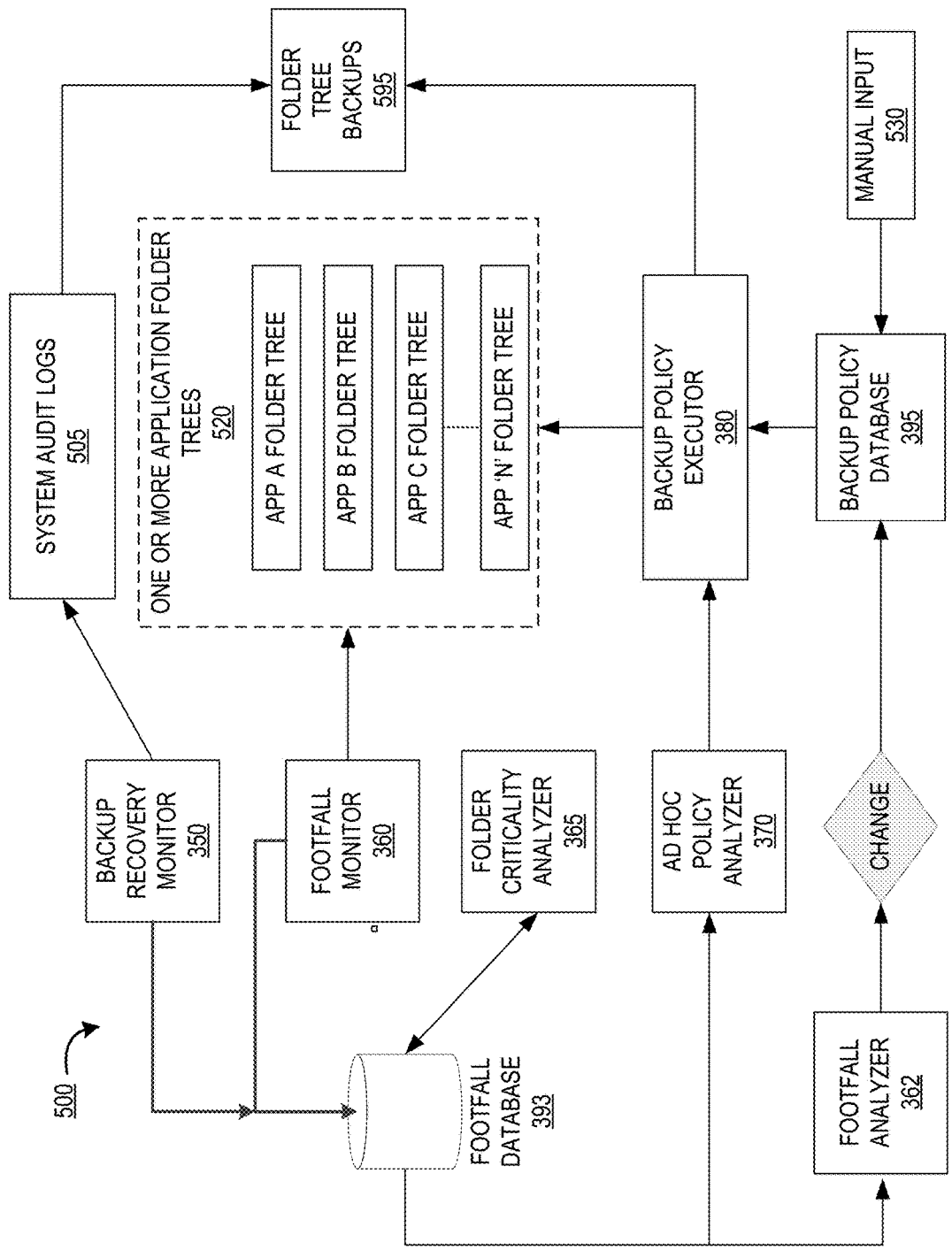
Figure 6:
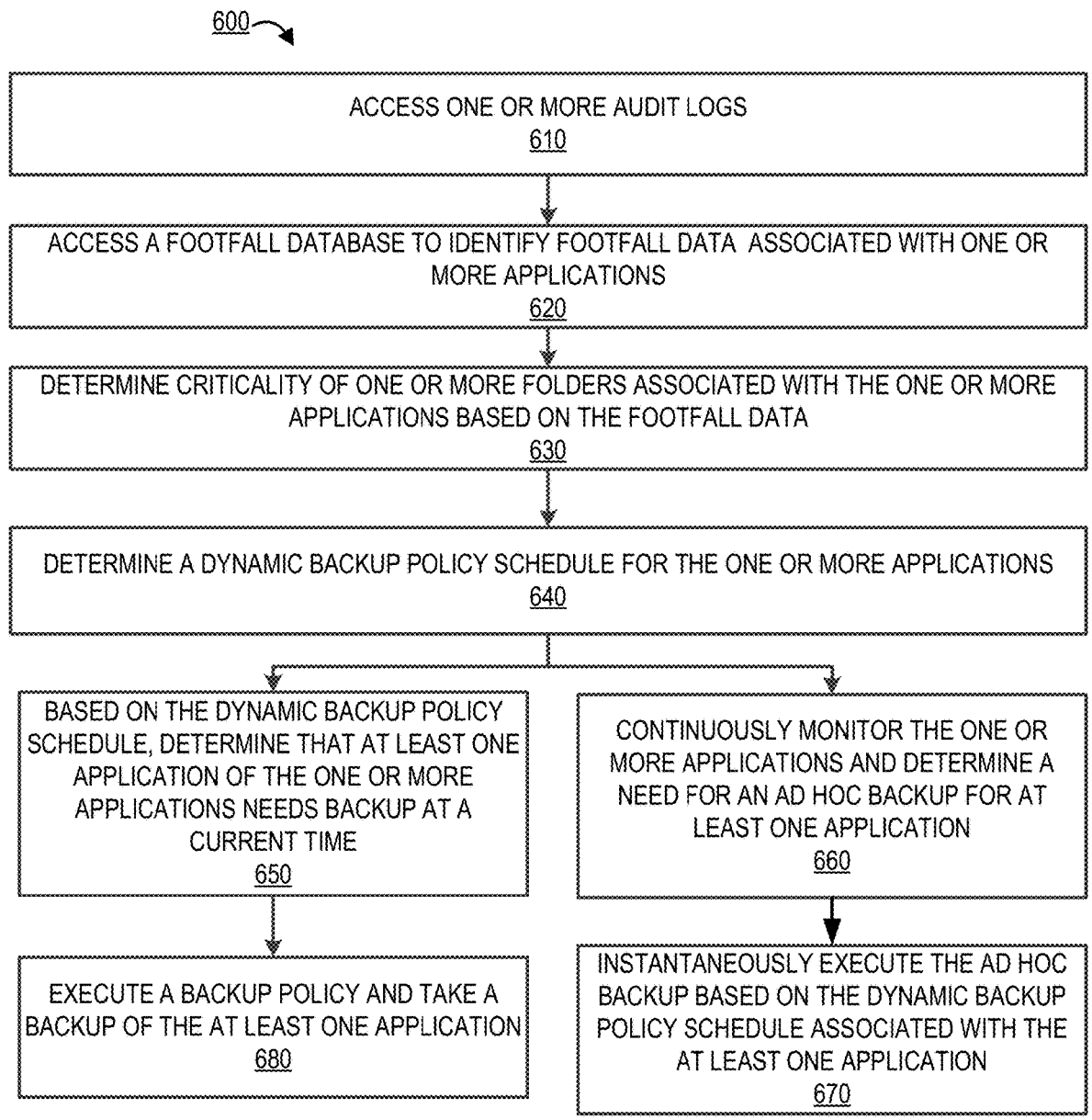
Figure 7:
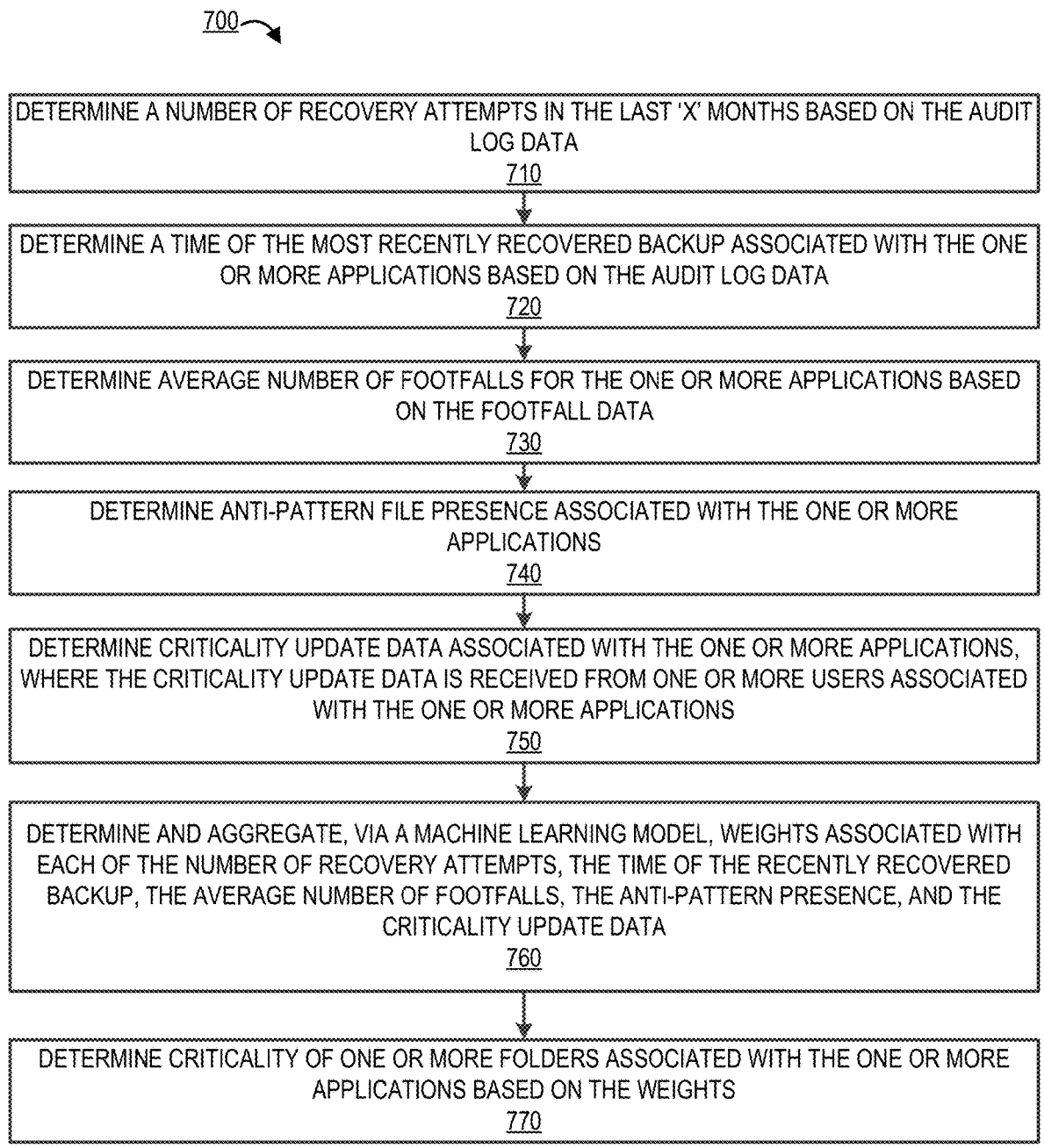
Figure 8A:
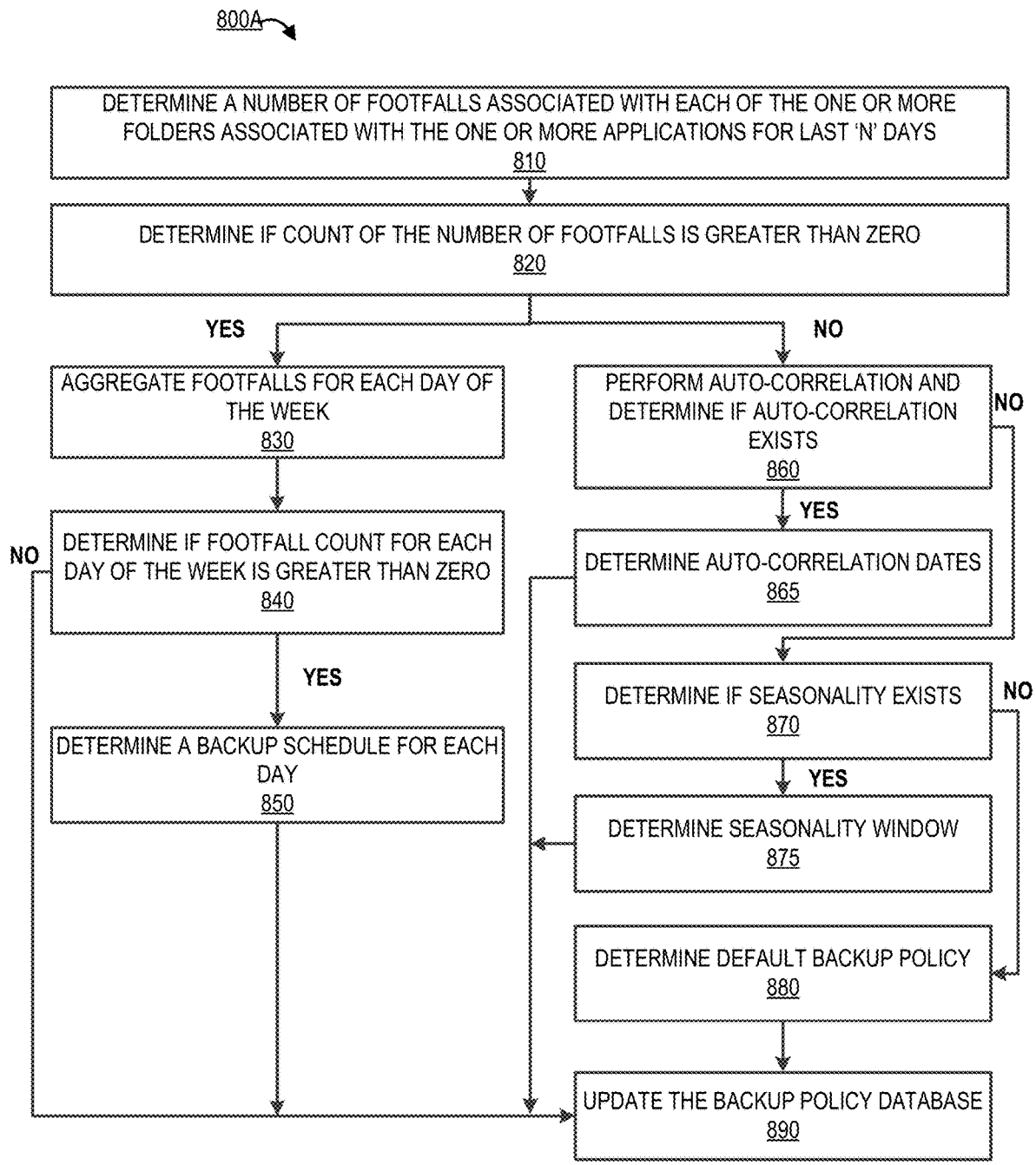
Figure 9:
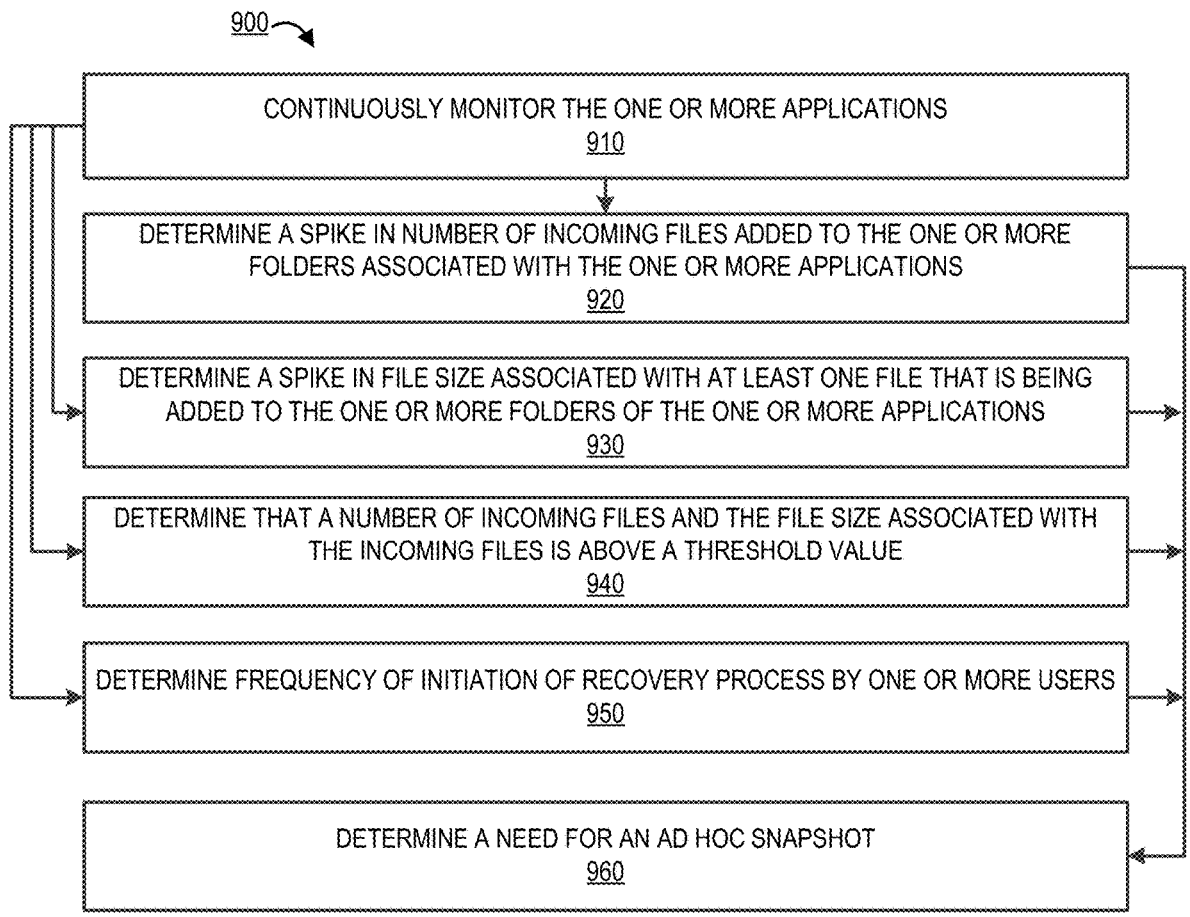

Having thus described embodiments of the invention in general terms, reference will now be made the accompanying drawings, wherein:

FIG. 1 provides a block diagram illustrating a system environment for dynamically calculating and executing data backup policies for a multi-tenant cluster storage, in accordance with an embodiment of the invention;

FIG. 2 provides a block diagram illustrating the entity system 200 of FIG. 1, in accordance with an embodiment of the invention;

FIG. 3 provides a block diagram illustrating a data backup policy execution system 300 of FIG. 1, in accordance with an embodiment of the invention;

FIG. 4 provides a block diagram illustrating the computing device system 400 of FIG. 1, in accordance with an embodiment of the invention;

FIG. 5 provides a block diagram illustrating a process for dynamically calculating and executing data backup policies for a multi-tenant cluster storage, in accordance with an embodiment of the invention;

FIG. 6 provides a flowchart illustrating a process flow for dynamically calculating and executing data backup policies for a multi-tenant cluster storage, in accordance with an embodiment of the invention;

FIG. 7 provides a flowchart illustrating a process flow for determining criticality of one or more folders associated with one or more applications, in accordance with an embodiment of the invention;

Figures 8B, 8C, 8D, 8E:
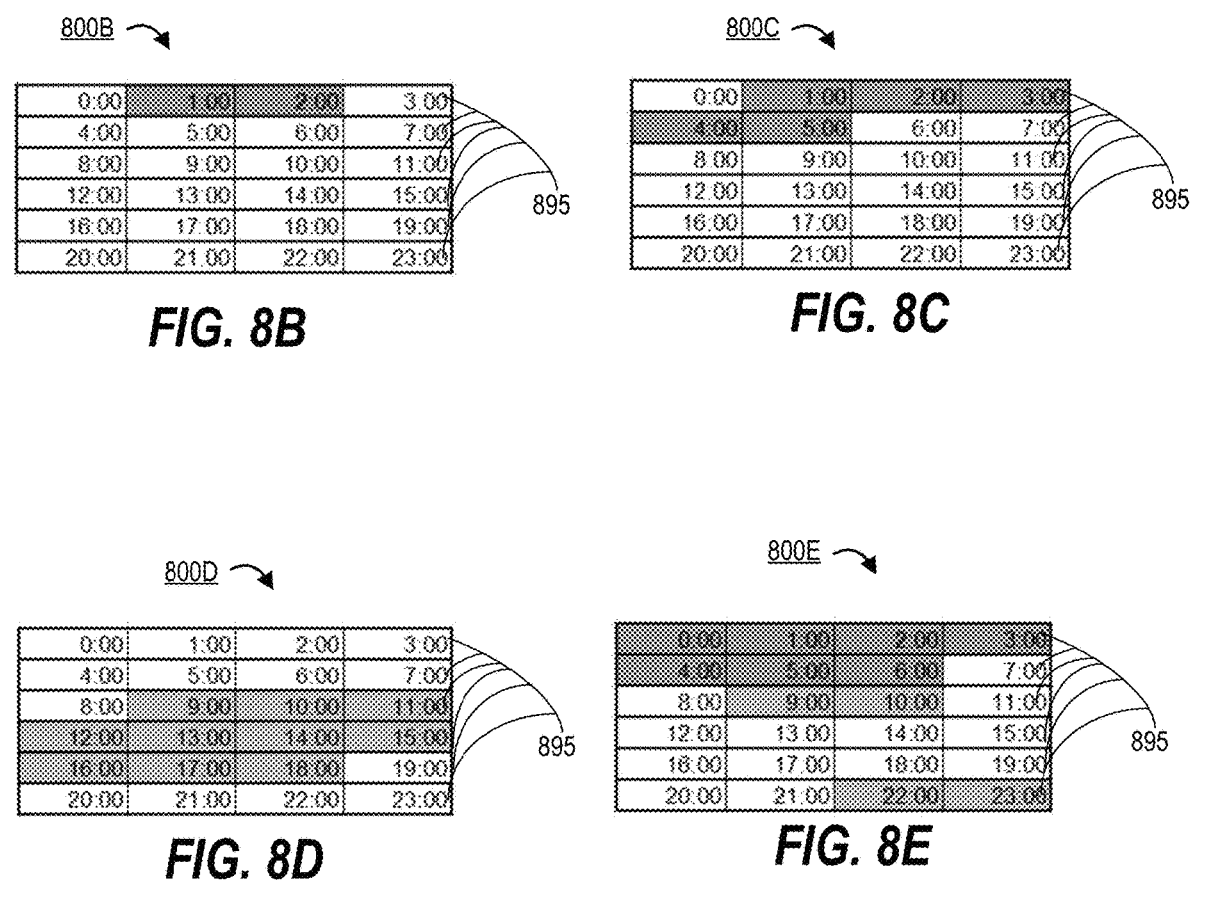

FIG. 8A provides a flowchart illustrating a process flow for dynamically calculating backup policy schedules for the one or more folders associated with the one or more applications, in accordance with an embodiment of the invention;

FIG. 8B, FIG. 8C, FIG. 8D, and FIG. 8E provide a block diagram illustrating time slots and daily footfalls associated with the one or more applications; and FIG. 9 provides a flowchart illustrating a process flow for determining a need for an ad hoc backup associated with the one or more applications, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications. Applications as described herein may be any software applications configured to perform one or more operations of the entity.

In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, multiple applications may be stored in an entity system and each application within an entity may be different in terms of criticality, backup requirements, importance, or the like. Conventional systems typically implement the same backup policies for all the applications in a multi-cluster storage and such a process may cause unnecessary consumption of memory and processing capabilities of the multi-tenant cluster storage system or an entity system that supports the multi-tenant cluster storage. As such, there exists a need for a system to efficiently execute backup policies for a multi-tenant cluster storage. The system of the present invention solves the aforementioned problem by dynamically calculating individual backup policy schedules for each folder of the one or more applications stored on the multi-tenant cluster and executing the individual backup policy schedules.

FIG. 1 provides a block diagram illustrating a system environment 100 for dynamically calculating and executing data backup policies for a multi-tenant cluster storage, in accordance with an embodiment of the invention. As illustrated in FIG. 1, the environment 100 includes a data backup policy execution system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The data backup policy execution system 300 is a system of the present invention for performing one or more process steps described herein. In some embodiments, the data backup policy execution system 300 may be an independent system. In some embodiments, the data backup policy execution system 300 may be a part of the entity system 200.

The data backup policy execution system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the data backup policy execution system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the data backup policy execution system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a data backup policy execution application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the data backup policy execution application 250, the one or more entity application 270 to perform certain logic, data-extraction, and data-storing functions of the entity system 200 described herein, as well as communication functions of the entity system 200.

The network server application 240, the data backup policy execution application 250, and the one or more entity applications 270 are configured to store data in the data repository 280 or to use the data stored in the data repository 280 when communicating through the network communication interface 210 with the data backup policy execution system 300, and/or the computing device system 400 to perform one or more process steps described herein. In some embodiments, the entity system 200 may receive instructions from the data backup policy execution system 300 via the data backup policy execution application 250 to perform certain operations. The data backup policy execution application 250 may be provided by the data backup policy execution system 300. The one or more entity applications 270 may be any of the applications used, created, modified, facilitated, and/or managed by the entity system 200.

FIG. 3 provides a block diagram illustrating the data backup policy execution system 300 in greater detail, in accordance with embodiments of the invention. As illustrated in FIG. 3, in one embodiment of the invention, the data backup policy execution system 300 includes one or more processing devices 320 operatively coupled to a network communication interface 310 and a memory device 330. In certain embodiments, the data backup policy execution system 300 is operated by an entity, such as a financial institution. In some embodiments, the data backup policy execution system 300 is owned or operated by the entity of the entity system 200. In some embodiments, the data backup policy execution system 300 may be an independent system. In alternate embodiments, the data backup policy execution system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the data backup policy execution system 300 described herein. For example, in one embodiment of the data backup policy execution system 300, the memory device 330 includes, but is not limited to, a network provisioning application 340, a backup recovery monitor 350, a footfall monitor 360, a footfall analyzer 362, a folder criticality analyzer 365, an ad hoc policy analyzer 370, a backup policy executor 380, and a data repository 390 comprising footfall database 393, backup policy database 395, and any other data processed or accessed by one or more applications in the memory device 330. The computer-executable program code of the network provisioning application 340, the backup recovery monitor 350, the footfall monitor 360, footfall analyzer 362, the folder criticality analyzer 365, and the Ad hoc policy analyzer 370 may instruct the processing device 320 to perform certain logic, data-processing, and data-storing functions of the data backup policy execution system 300 described herein, as well as communication functions of the data backup policy execution system 300.

The network provisioning application 340, the backup recovery monitor 350, the footfall monitor 360, the footfall analyzer 362, the folder criticality analyzer 365, the ad hoc policy analyzer 370, and the backup policy executor 380 are configured to invoke or use the data in the data repository 390 when communicating through the network communication interface 310 with the entity system 200, and/or the computing device system 400. In some embodiments, the network provisioning application 340, the backup recovery monitor 350, the footfall monitor 360, the footfall analyzer 362, the folder criticality analyzer 365, the ad hoc policy analyzer 370, and the backup policy executor 380 may store the data extracted or received from the entity system 200, and the computing device system 400 in the data repository 390. In some embodiments, the network provisioning application 340, the backup recovery monitor 350, the footfall monitor 360, the footfall analyzer 362, the folder criticality analyzer 365, the ad hoc policy analyzer 370, and the backup policy executor 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a data backup policy execution application 421, entity application 424. These applications also typically instructions to a graphical user interface (GUI) on the display 430 that allows the user 110 to interact with the entity system 200, the data backup policy execution system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the data backup policy execution application 421 provided by the data backup policy execution system 300 allows the user 110 to access the data backup policy execution system 300. In some embodiments, the entity application 424 provided by the entity system 200 and the data backup policy execution application 421 allow the user 110 to access the functionalities provided by the data backup policy execution system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram 500 illustrating a process for dynamically calculating and executing data backup policies for a multi-tenant cluster storage, in accordance with an embodiment of the invention. As shown, the backup recovery monitor 350 of the system accesses one or more audit logs 505 from an audit database stored in the entity system 200 and/or the data backup policy execution system 300. The footfall monitor 360 of the references the one or more application folder trees 520 (e.g., App 'A' folder tree, App 'B' folder tree, App 'C' folder tree, through App 'N' folder tree) and identifies one or more footfalls associated with each of the one or more application folder trees 520 from the footfall database 393. The folder criticality analyzer 365 analyzes criticality associated with each of the one or more application folder trees 520 as explained in detail in FIG. 7 and relays the criticality information back to the footfall database 393. The Footfall analyzer 362 then takes the criticality information, footfall information, and the audit log information and determines dynamic backup policy schedule associated with each of the one or more application folder trees as explained in detail in FIG. 8 below. The footfall analyzer 362 then determines a change by comparing the dynamic backup policy schedule with the existing backup schedule previously generated by the system and updates the backup policy database 395. In some embodiments, a manual input 530 may be provided by one or more users (e.g., application developer, or the like) associated with the one or more applications, where the manual input 530 is associated with the dynamic backup policy schedule. The ad hoc policy analyzer 370 determines a need for an ad hoc backup as explained in detail in FIG. 9 and instantaneously causes the backup policy executor 380 to create folder tree backups 595 (e.g., snapshots) of the at least one of the one or more application folder trees 520. In addition, the backup policy executor also creates the folder tree backups based on the dynamic backup policy schedule that is stored in the backup policy database 395.

FIG. 6 provides a flowchart 600 illustrating a process flow for dynamically calculating and executing data backup policies for a multi-tenant cluster storage, in accordance with an embodiment of the invention. As shown in block 610, the system accesses one or more audit logs. The one or more audit logs may be stored in the entity system 200 and/or the data backup policy execution system 300. The one or more audit logs comprise information associated with at least data backup recoveries associated with one or more applications of the entity.

As shown in block 620, the system accesses a footfall database to identify footfall data associated with one or more applications. Footfall data comprises information associated with footfalls (e.g., incoming files that are added to one or more folders of the one or more applications, files that are deleted from the one or more folders of the one or more applications, or the like). Footfall data may be associated with any change to one or more folders associated with the one or more applications. For example, an application may comprise one or more folders that store any information associated with the application.

As shown in block 630, the system determines criticality of the one or more folders associated with the one or more applications based on the footfall data. Determining criticality level associated with each of the one or more folders allows the system to determine a dynamic back policy schedule for each of the one or more folders individually. This eliminates the need for storing backup of all folders associated with all applications, thereby reducing the memory consumption of the system. Process flow associated with determining criticality of the one or more folders is explained in FIG. 7 below.

As shown in block 640, the system calculates a dynamic backup policy schedule for the one or more applications. The system calculates the dynamic backup policy schedule and stores the dynamic backup policy schedule for each of the one or more applications in a backup policy database. The process flow associated with determining dynamic backup policy schedule is explained in FIG. 8 below.

As shown in block 650, the system based on the dynamic backup policy schedule, determines that at least one application of the one or more applications needs backup at a current time. For example, the backup policy database may comprise a schedule for each folder associated with each of the one or more applications and the system may continuously refer the backup policy database and determine that at least one application needs back at a current time. As shown in block 660, the system executes a backup policy and take a backup of the at least one application.

As shown in block 670, in addition to adhering to the dynamic backup schedule generated by the system, the system also continuously monitors the one or more applications and determine a need for an ad hoc backup for at least one application. There may be certain instances which warrant for an ad hoc backup of a certain application. Such instances and the process flow associated with determining a need for an ad hoc backup is discussed in detail in FIG. 9 below. As shown in block 680, the system in response to determining the need for the ad hoc snapshot, instantaneously executes the ad hoc backup based on the dynamic backup policy schedule associated with the at least one application. In response to determining the need for the ad hoc backup, the system may determine that the dynamic backup policy schedule associated with the folder that needs the ad hoc snapshot does not have a scheduled backup at that time before executing the ad hoc backup. In some embodiments, where a backup is already scheduled at the time the system determines the need for an instantaneous ad hoc back up, the system does not execute the ad hoc backup mechanism.

FIG. 7 provides a flowchart 700 illustrating a process flow for determining criticality of one or more folders associated with one or more applications, in accordance with an embodiment of the invention. As shown in block 710, the system determines a number of recovery attempts in the last 'X' months based on the audit log data. For example, a user (e.g., application developer, or the like) may attempt to recover at least one application using a backup (e.g., snapshot or the like) in case of an event (e.g., malicious event, ransomware event, application crash, or the like). The system identifies a number of recovery attempts associated with each folder of the one or more applications based on the audit log data for last 'X' days/months. The number of months or days used for the value of 'X' may be determined by a machine learning model based on historical data and user input. The system may then determine the number of recovery attempts is greater or lower than a predetermined value calculated by the machine learning model and assigns a weight to the number of recovery attempts. For example, the system may determine that then the number of recovery attempts is greater/less than 'A' and may assign a weight 'W1' to the number of recovery attempts parameter accordingly.

As shown in block 720, the system determines a time of the recently recovered backup associated with the one or more applications based on the audit log data. The system may then determine the time associated with the recently recovered backup performed by the one or more users and may compare it against a predetermined value calculated by the machine learning model. Based on the comparison, the system assigns a weight to the time of recently recovered backup parameter. For example, the system may determine that the time associated with the recently recovered backup is less/more than 'B' days and may assign a weight 'W2' to the time of recently recovered backup parameter accordingly.

As shown in block 730, the system determines average number of footfalls for the one or more applications based on the footfall data. The system may determine the average number of footfalls for a duration (e.g., day) and may compare it against a predetermined value calculated by the machine learning model. Based on the comparison, the system assigns a weight to the average number of footfalls parameter. For example, the system may determine that the average number of footfalls per day is less than 'C' and may assign a weight 'W3' to the average number of footfalls parameter accordingly.

As shown in block 740, the system determines anti-pattern file presence associated with the one or more applications. Anti-pattern file presence discloses information associated with unimportant files/data present in the one or more folders associated with the one or more applications. Based on determining a percentage of anti-pattern file presence, the system compares the percentage with a predetermined value that is calculated by the machine learning model. In response to comparing, the system assigns a weight to the anti-pattern presence parameter. For example, the system may determine that a folder comprises log files, executable files, or the like and may determine that the percentage of the anti-pattern file presence is 'D %.' the system then determine that the percentage is greater/less than the predetermined value of 'E %' and may assign a weight of 'W4' to the anti-pattern file presence parameter accordingly.

As shown in block 750, the system determines criticality update data associated with the one or more applications, where the criticality update data is received from one or more users associated with the one or more applications. A user may assign a criticality parameter to the one or more folders of the one or more applications. The system compares the criticality parameter assigned by the user with a predetermined value that is calculated by the machine learning model and assigns a weight to the criticality parameter. For example, the system may determine the criticality parameter is greater/less than 'F' and may assign a weight 'W5' to the criticality parameter accordingly. In some embodiments, the system may consider how old the criticality parameter provided by the one or more users is and may assign a weight accordingly.

As shown in block 760, the system determines aggregates, via a machine learning model, weights associated with each of the number of recovery attempts, the number of recovered backups, the average number of footfalls, the anti-pattern presence, and the criticality update data as explained above. As shown in block 770, the system determines criticality of one or more folders associated with the one or more applications based on the weights. The system adds weights of the one or more parameters and may determine whether the aggregate weight associated with each of the one or more folders of the one or more applications is above or below a threshold value that is calculated by the machine learning model. In one embodiment where the aggregate weight is above the threshold value, the system assigns a high criticality to the one or more folders. In another embodiment where the aggregate weight is below the threshold value, the system assigns a low criticality to the one or more folders. For example, the system aggregates the weights 'W1,' 'W2,' 'W3,' 'W4,' and 'W5' and determines whether the aggregate weight is above or below 'H.'

FIG. 8 provides a flowchart 800A illustrating a process flow for dynamically calculating backup policy schedules for the one or more folders associated with the one or more applications, in accordance with an embodiment of the invention.

As shown in block 810, the system determines a number of footfalls associated with each of the one or more folders associated with the one or more applications for last 'n' days. In some preferable embodiments of the present invention, the system determines the number of footfalls associated with only critical folders that are identified in FIG. 7. The number of footfalls is identified from the footfall data stored in the footfall database.

As shown in block 820, the system determines if count of the number of footfalls is greater than zero. In an embodiment where the count of the number of footfalls is greater than zero the process flow proceeds to block 830. As shown in block 830, the system aggregates footfalls for each day of the week. For example, for a folder 'A' there may receive two footfalls in the morning and five footfalls in the evening on Monday, the system aggregates that the count of the number of footfalls as seven. As shown in block 840, the system determines if footfall count for each day of the week is greater than zero. In an embodiment, where the footfall count for each day of the week is greater than zero, the process flow proceeds to block 850. As shown in block 850, the system determines a backup schedule for each day. The system determines that backup policy schedule for each day based on the number of footfalls expected at a certain time of the day that is based on historical footfall data and/or scheduled footfall data (e.g., an application is scheduled to receive ten files at 09:00 hours every Monday). In some embodiments, the system may split a day into six time slots 895, where each time slot comprises four hours as shown in FIG. 8B through FIG. 8G, and determines the backup schedule for every time slot when a footfall for that time slots ends. As shown in 800B of FIG. 8B, if a folder of an application has only one footfall which typically starts at 01:00 hours and ends at 02:00 hours, the system may determine that a backup is needed at 02:00 hours. In the next exemplary embodiment, as shown in 800C of FIG. 8C, if a folder of an application has one footfall which starts at 01:00 hours and ends at 05:00 hours, the system may determine that backups are needed twice in two time slots, where a first backup is performed at 03:00 hours and a second backup is performed at 05:00. In another exemplary embodiment as shown in 800D of FIG. 8D, the system may determine that an application has a footfall that starts at 09:00 hours and ends at 18:00 hours, the system may determine that backups are needed thrice in three time slots, where a first backup is performed at 11:00 hours, a second backup is performed at 15:00 hours, and a third backup is performed at 18:00 hours. In another exemplary embodiment as shown in 800E of FIG. 8E, the system may determine that an application has a first footfall that starts at 00:00 hours and ends at 06:00 hours, a second footfall that starts at 09:00 hours and ends at 10:00 hours, and a third footfall that starts at 22:00 hours and ends at 23:00 hours, the system may determine that backups are needed four times in four time slots, where a first backup is performed at 03:00 hours, a second backup is performed at 06:00 hours, a third backup is performed at 10:00 hours, and a fourth backup is performed at 23:00 hours. In another embodiment, where the footfall count for each day is not greater than zero as determined in block 840, the process flow proceeds to block 890, where the system updates the backup policy database that no backup is required for that particular day where the footfall count is not greater than zero. It should be understood that the number of time slots and the number of hours per time slot may vary and a machine learning model may determine the number of time slots and the number of hours per time slot to achieve an optimized and quick solution.

In an embodiment where the count of the number of footfalls is less than zero the process flow proceeds to block 860. As shown in block 860, the system performs auto-correlation and determine if auto-correlation exists. In one embodiment, the system determines that auto-correlation exists and the process flow may proceed to block 865. For example, the system based on the historical footfall data may determine that footfalls may occur only on the last day of every month for a certain application. As shown in block 865, the system determines auto-correlation dates. Continuing with the previous example, the system may determine the autocorrelation data as the last day of every month. Upon determining the auto-correlation dates, the system updates the backup policy database as shown in block 890 with the backup policy schedule for that particular application as the auto-correlation dates.

In an embodiment, where the autocorrelation does not exist as determined in block 860, the process flow proceeds to block 870. As shown in block 870, the system determines if seasonality exists. In an embodiment, where seasonality exists, the process flow proceeds to block 880. For example, the system may determine that footfalls for an application may occur at the end of every quarter and may last for a week. In another example, the system may determine that footfalls for an application may occur at the end of every year and may last for two weeks. As shown in block 875, the system determine seasonality window. Continuing with the previous example, the system may determine the seasonality window of the application as the last two weeks of every year. The system after determining the sensuality window, updates the backup policy database as shown in block 890 with the backup policy schedule for that particular application as the seasonality window determined by the system.

In an embodiment, where seasonality does not exist as determined in block 870, the process flow proceeds to block 880. As shown in block 880, the system determines standard backup policy. In an event, where none of the above conditions are true, the system may then determine the standard backup policy that is set by the one or more users while onboarding the application as the backup policy and may update the backup policy database as shown in block 890.

In some embodiments, before initiating the backup, the system may determine that the volume of the memory is healthy before initiating the backup process. In an embodiment where the volume of the memory of the system or backup database is not adequate, the system generates a notification and alerts the one or more user before taking the backup in an attempt not to occlude the process completely.

FIG. 9 provides a flowchart 900 illustrating a process flow for determining a need for an ad hoc backup associated with the one or more applications, in accordance with an embodiment of the invention. As shown in block 910, the system continuously monitors, in real-time, the one or more applications. The system may monitor one or more footfalls and any recovery related activity associated with the one or more applications. In some embodiments, the system may continuously monitor applications that are critical as determined in FIG. 7.

As shown in block 920, the system determines a spike in number of incoming files added to the one or more folders associated with the one or more applications. For example, typically an application may receive five files per day and in some instances the application may receive fifty files at a time. The system may identify increase in volume of the number of incoming files and may determine the need for an ad hoc snapshot as shown in block 960.

As shown in block 930, the system determines a spike in file size associated with at least one file that is being added to the one or more folders of the one or more applications. For example, an application system may typically receive a few gigabytes of data and in some instances the application may receive fifty terabytes of data. The system may identify such spike in the incoming file size that us being added to the one or more folders and may determine the need for an ad hoc snapshot as shown in block 960.

As shown in block 940, the system determines that a number of incoming files and the file size associated with the incoming files is above a threshold value. The system may look at the combination where the number of incoming files and the size of incoming files is different from the typical activity associated with a particular folder of a particular application and may determine the need for an ad hoc snapshot as shown in block 960.

As shown in block 950, the system determines frequency of initiation of recovery process by one or more users. For example, the system may determine that a user initiates the recovery process using a backup on every Monday of the week and may determine the need for an ad hoc snapshot on every Monday as shown in block 960.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for calculating and executing data backup policies for a multi-tenant cluster storage, the system comprising:
   at least one network communication interface;
   at least one non-transitory storage device; and
   at least one processing device coupled to the at least one non-transitory storage device and the at least one network communication interface, wherein the at least one processing device is configured to:
   access one or more audit logs associated with one or more applications, where the one or more applications comprise one or more folders;
   access a footfall database to identify footfall data associated with the one or more applications;

determine criticality of the one or more folders associated with the one or more applications based on the footfall data;
determine a dynamic backup policy schedule for the one or more applications;
store the dynamic backup policy schedule in a backup policy database;
based on the dynamic backup policy schedule, determine that at least one application of the one or more applications needs backup at a current time; and
execute a backup policy and take a backup of the at least one application.

2. The system of claim 1, wherein the at least one processing device is configured to:
continuously monitor the one or more applications and determine a need for an ad hoc backup for at least one application; and
instantaneously execute the ad hoc backup based on the dynamic backup policy schedule associated with the at least one application.

3. The system of claim 2, wherein the at least one processing device is configured to determine the need for the ad hoc backup for the at least one application based on performing at least one of:
determining a spike in a number of incoming files added to the one or more folders associated with the one or more applications;
determining a spike in file size associated with the incoming files that is being added to the one or more folders of the one or more applications;
determining that a combination of the number of the incoming files and the file size of the incoming files is above a threshold value; and
determining frequency of initiation of recovery process by one or more users.

4. The system of claim 1, wherein the at least one processing device is configured to determine the criticality of the one or more folders based on:
determining a number of recovery attempts in a predefined amount of time based on audit log data from the one or more audit logs;
determining a time of a most recently recovered backup associated with the one or more applications based on the audit log data;
determining average number of footfalls for the one or more applications based on the footfall data;
determining anti-pattern file presence associated with the one or more applications;
determining criticality update data associated with the one or more applications, wherein the criticality update data is received from one or more users associated with the one or more applications; and
determining, via a machine learning model, weights associated with each of the number of recovery attempts, the time of the recently recovered backup, the average number of footfalls, the anti-pattern presence, and the criticality update data.

5. The system of claim 4, wherein the at least one processing device is configured to:
aggregating the weights determined by the machine learning model;
determining that aggregated weight is above or below a predefine value; and
determining the criticality of the one or more folders associated with the one or more applications based determining that the aggregated weight is above or below the predefined value.

6. The system of claim 1, wherein the at least one processing device is configured to determine the dynamic backup policy schedule for the one or more applications based on:
determining a number of footfalls associated with each of the one or more folders associated with the one or more applications for a predefined amount of time;
determining that count of the number of footfalls for the predefined amount of time is greater than zero;
aggregating daily footfalls for each day of a week based on the footfall data;
determining dynamic backup policy schedule for the each day of the week based on start time and end time of the daily footfalls for the each day; and
updating the backup policy database with the dynamic backup policy schedule.

7. The system of claim 6, wherein the at least one processing device is configured to:
determine that the count of the number of footfalls for the predefined amount of time is not greater than zero and perform one of (i) determining if auto-correlation exists based on the footfall data or (ii) determining if seasonality exists based on the footfall data; and
update the backup policy database based on determining that (i) the auto-correlation exists or (ii) the seasonality exists.

8. A computer program product for calculating and executing data backup policies for a multi-tenant cluster storage, the computer program product comprising a non-transitory computer-readable storage medium having computer executable instructions for causing a computer processor to perform the steps of:
accessing one or more audit logs associated with one or more applications, where the one or more applications comprise one or more folders;
accessing a footfall database to identify footfall data associated with the one or more applications;
determining criticality of the one or more folders associated with the one or more applications based on the footfall data;
determining a dynamic backup policy schedule for the one or more applications;
storing the dynamic backup policy schedule in a backup policy database;
based on the dynamic backup policy schedule, determining that at least one application of the one or more applications needs backup at a current time; and
executing a backup policy and take a backup of the at least one application.

9. The computer program product of claim 8, wherein the computer executable instructions cause the computer processor to perform the steps of:
continuously monitoring the one or more applications and determine a need for an ad hoc backup for at least one application; and
instantaneously executing the ad hoc backup based on the dynamic backup policy schedule associated with the at least one application.

10. The computer program product of claim 9, wherein the computer executable instructions cause the computer processor to perform the step of determining the need for the ad hoc backup for the at least one application based on performing at least one of:
determining a spike in a number of incoming files added to the one or more folders associated with the one or more applications;

determining a spike in file size associated with the incoming files that is being added to the one or more folders of the one or more applications;

determining that a combination of the number of the incoming files and the file size of the incoming files is above a threshold value; and determining frequency of initiation of recovery process by one or more users.

11. The computer program product of claim 8, wherein the computer executable instructions cause the computer processor to perform the steps of determining the criticality of the one or more folders based on:

determining a number of recovery attempts in a predefined amount of time based on audit log data from the one or more audit logs;

determining a time of a most recently recovered backup associated with the one or more applications based on the audit log data;

determining average number of footfalls for the one or more applications based on the footfall data;

determining anti-pattern file presence associated with the one or more applications;

determining criticality update data associated with the one or more applications, wherein the criticality update data is received from one or more users associated with the one or more applications; and determining, via a machine learning model, weights associated with each of the number of recovery attempts, the time of the recently recovered backup, the average number of footfalls, the anti-pattern presence, and the criticality update data.

12. The computer program product of claim 11, wherein the computer executable instructions cause the computer processor to perform the steps of:

aggregating the weights determined by the machine learning model;

determining that aggregated weight is above or below a predefine value; and determining the criticality of the one or more folders associated with the one or more applications based determining that the aggregated weight is above or below the predefined value.

13. The computer program product of claim 8, wherein the computer executable instructions cause the computer processor to perform the steps of determining the dynamic backup policy schedule for the one or more applications based on:

determining a number of footfalls associated with each of the one or more folders associated with the one or more applications for a predefined amount of time;

determining that count of the number of footfalls for the predefined amount of time is greater than zero;

aggregating daily footfalls for each day of a week based on the footfall data;

determining dynamic backup policy schedule for the each day of the week based on start time and end time of the daily footfalls for the each day; and updating the backup policy database with the dynamic backup policy schedule.

14. The computer program product of claim 13, wherein the computer executable instructions cause the computer processor to perform the steps of:

determining that the count of the number of footfalls for the predefined amount of time is not greater than zero and perform one of (i) determining if auto-correlation exists based on the footfall data or (ii) determining if seasonality exists based on the footfall data; and updating the backup policy database based on determining that (i) the auto-correlation exists or (ii) the seasonality exists.

15. A computer implemented method for calculating and executing data backup policies for a multi-tenant cluster storage, wherein the method comprises:

accessing one or more audit logs associated with one or more applications, where the one or more applications comprise one or more folders;

accessing a footfall database to identify footfall data associated with the one or more applications;

determining criticality of the one or more folders associated with the one or more applications based on the footfall data;

determining a dynamic backup policy schedule for the one or more applications;

storing the dynamic backup policy schedule in a backup policy database;

based on the dynamic backup policy schedule, determining that at least one application of the one or more applications needs backup at a current time; and executing a backup policy and take a backup of the at least one application.

16. The computer implemented method of claim 15, wherein the method comprises:

continuously monitoring the one or more applications and determine a need for an ad hoc backup for at least one application; and instantaneously executing the ad hoc backup based on the dynamic backup policy schedule associated with the at least one application.

17. The computer implemented method of claim 16, wherein determining the need for the ad hoc backup for the at least one application is based on performing at least one of:

determining a spike in a number of incoming files added to the one or more folders associated with the one or more applications;

determining a spike in file size associated with the incoming files that is being added to the one or more folders of the one or more applications;

determining that a combination of the number of the incoming files and the file size of the incoming files is above a threshold value; and determining frequency of initiation of recovery process by one or more users.

18. The computer implemented method of claim 15, wherein determine the criticality of the one or more folders is based on:

determining a number of recovery attempts in a predefined amount of time based on audit log data from the one or more audit logs;

determining a time of a most recently recovered backup associated with the one or more applications based on the audit log data;

determining average number of footfalls for the one or more applications based on the footfall data;

determining anti-pattern file presence associated with the one or more applications;

determining criticality update data associated with the one or more applications, wherein the criticality update data is received from one or more users associated with the one or more applications; and determining, via a machine learning model, weights associated with each of the number of recovery attempts, the time of the recently recovered backup, the average number of footfalls, the anti-pattern presence, and the criticality update data.

19. The computer implemented method of claim 18, wherein the method further comprises:
  aggregating the weights determined by the machine learning model;
  determining that aggregated weight is above or below a predefine value; and
  determining the criticality of the one or more folders associated with the one or more applications based determining that the aggregated weight is above or below the predefined value.

20. The computer implemented method of claim 15, wherein determining the dynamic backup policy schedule for the one or more applications is based on:
  determining a number of footfalls associated with each of the one or more folders associated with the one or more applications for a predefined amount of time;
  determining that count of the number of footfalls for the predefined amount of time is greater than zero;
  aggregating daily footfalls for each day of a week based on the footfall data;
  determining dynamic backup policy schedule for the each day of the week based on start time and end time of the daily footfalls for the each day; and
  updating the backup policy database with the dynamic backup policy schedule.

* * * * *